Patented Nov. 8, 1927.

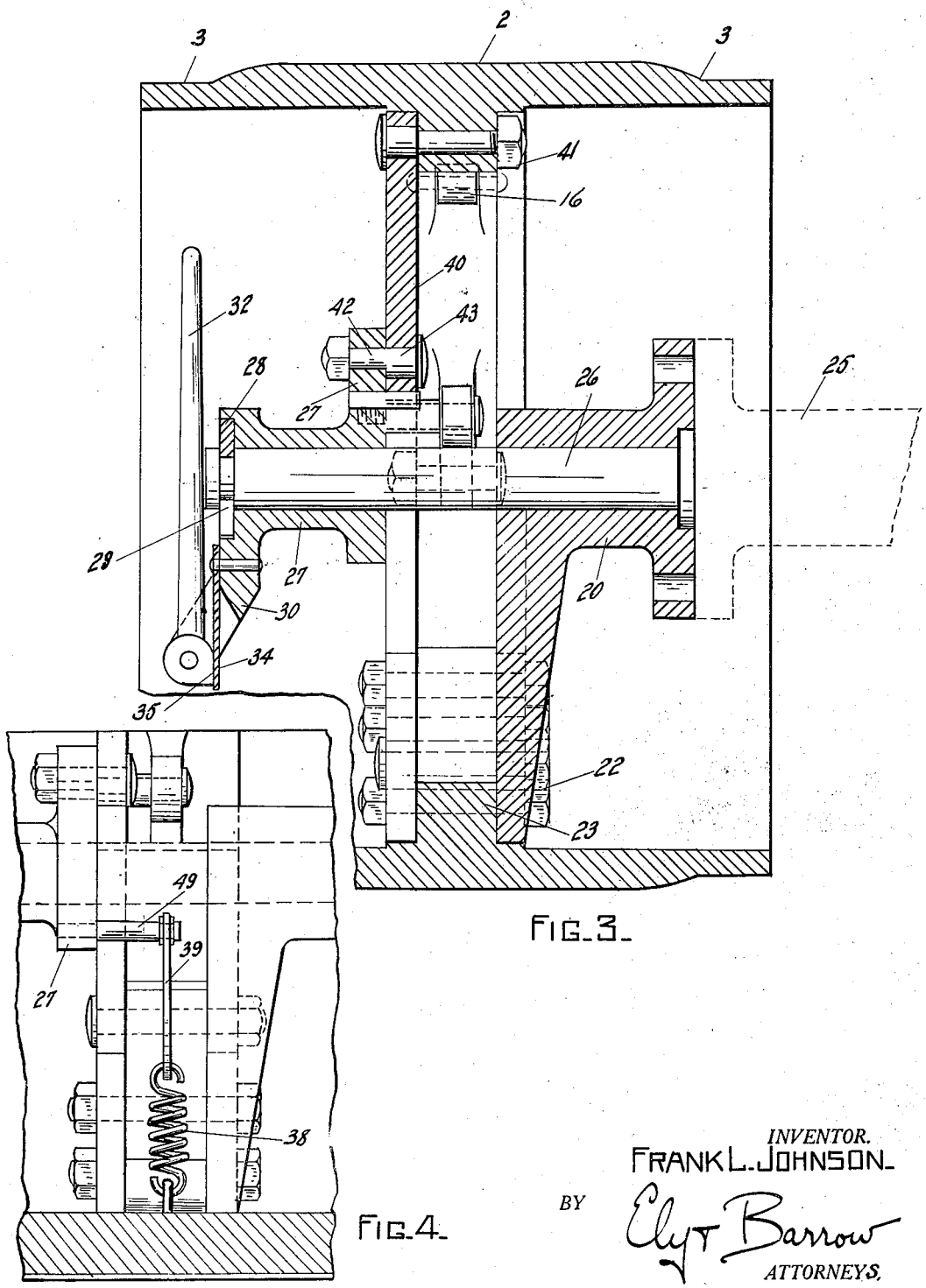

1,648,132

UNITED STATES PATENT OFFICE.

FRANK L. JOHNSON, OF AKRON, OHIO.

COLLAPSIBLE TIRE-BUILDING DRUM.

Application filed February 8, 1927. Serial No. 166,668.

This invention relates to the art of building pneumatic tires and particularly to collapsible drums or forms such as used in the manufacture of tires by the flat band or pulley method.

In forms of this type, it is quite frequent to make the drum contractible so that its diameter can be reduced to permit removal of the band. In certain forms of drums the edges of the band are smaller in circumference than the central portions of the bands, and as inextensible beads are used in the manufacture of tires by this method, it is necessary to collapse the drum in order to remove the band.

The present invention relates to a collapsible drum for the purposes set forth and particularly to the collapsing mechanism in the center of the drum by which it may be readily and quickly contracted to permit removal of the completed band. The objects of the invention are to simplify constructions of this general type, and to facilitate the collapsing of the drums, and to construct a collapsing mechanism which may be incorporated in drums of various types and sizes.

In the drawings in which one form of the invention is illustrated:

Figure 3 is a vertical cross section in the line 3—3 of Figure 1; and

Figure 4 is a section on the line 4—4 of Figure 1.

Figure 1:
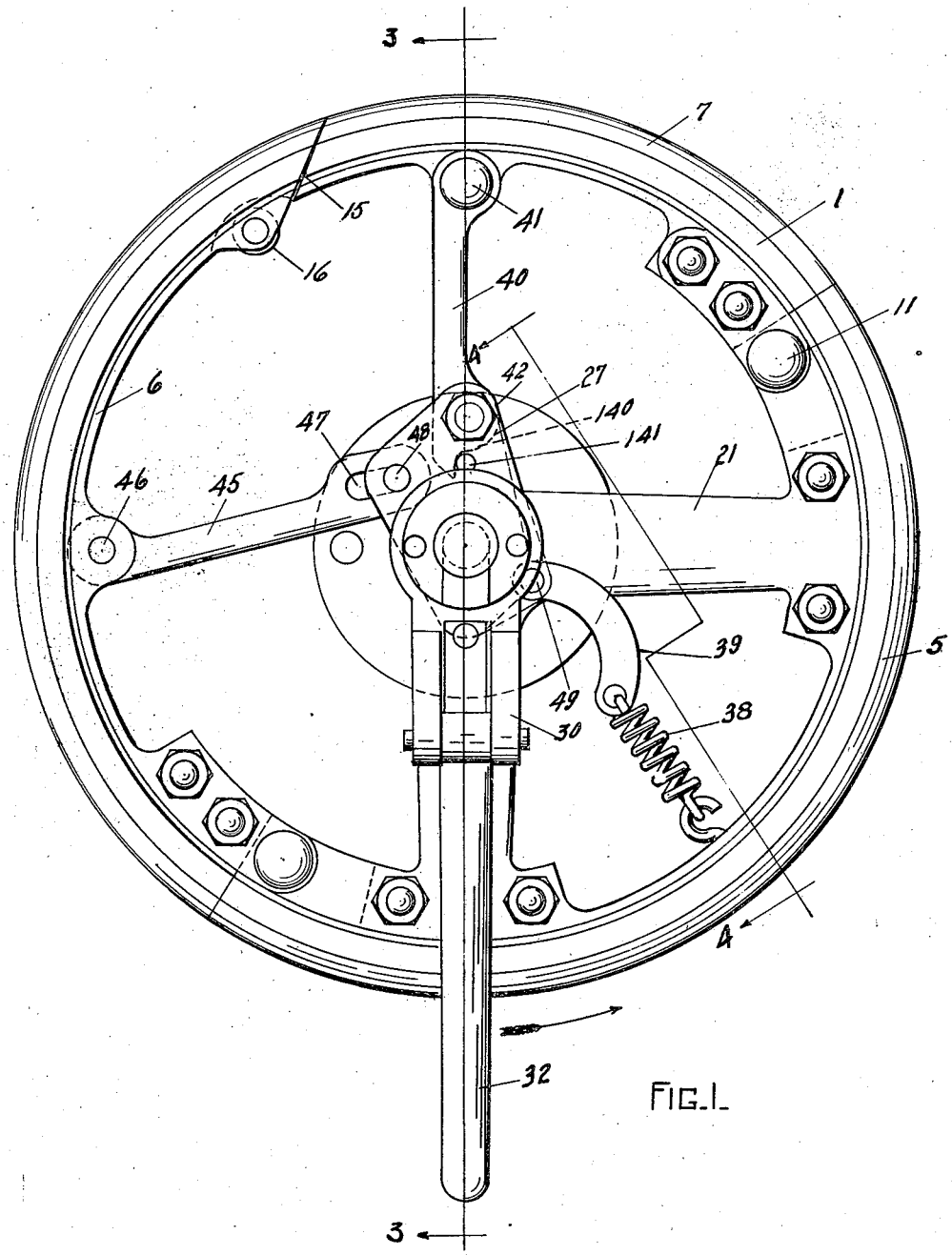
Figure 1 is a side view of the drum in circular condition.

The drum comprises two portions, one the outer ring or drum proper, and the other the chuck or collapsing mechanism. The drum or form 1 may be provided with a raised central portion 2 and depressed outer edges or bead seats 3 if the tire is to be built with bead portions set inwardly from the main body of the band, or, as an alternative, the drum may be cylindrical, depending upon the method of building the tire.

The drum is divided into a plurality of segments 5, 6 and 7, the segment 5 being a stationary or fixed segment and the segments 6 and 7 hinged to the ends of the fixed segment, preferably by straps 10 which are connected to the section 5 by hinge pins 11.

The segments 6 and 7 are separated preferably by an oblique cut 15. In collapsing the drum the segment 7 is moved inwardly of the segment 6 and the latter is provided with a roller 16 which bears upon the surface of the segment 7 during the major portion of the collapsing movement and thereby reduces the friction between the parts.

The fixed segment 1, and consequently the whole drum proper is detachably secured to a chuck or central supporting member which consists of a chuck body 20 having two radiating arms 21, the extremities of which are secured by bolts 22 to a flange or rib 23 centrally arranged on the inner surface of the drum. The chuck body is designed to be secured to the end of the main shaft 25 of a tire making machine or stand. In the center of the chuck body is fixed a supporting shaft 26 on the projecting outer end of which is rotatably mounted an operating plate or crank 27 which is held in position upon the shaft by an attached key 28 which is received within a groove 29 on the outer end of the shaft 26. A radial projection 30 on the crank affords a means of rotating the operating plate and is provided with a pivoted operating lever or handle. This handle is normally kept in upright position, as shown in Figure 3, by a leaf spring 34 which is attached to the crank and bears against a flattened surface 35 at the pivot point of the lever. When the collapsing mechanism is to be operated the lever 32 is moved outwardly to the position shown in Figure 1 and then rotated. The crank plate is normally retained in the position in which the drum is expanded by a coil spring 38 which is attached to the fixed section 5 at one end and to a curved link 39 at the other, the link being attached to a pin 49 upon the rear of the crank plate 27.

The crank plate is connected to the end of the section 7 by means of a link 40, the connection 41 between the segment and link being detachable. The inner end of the link 40 is connected to the crank plate by a bolt 42, the portion 43 which passes through the link 40 being eccentric so that the bolt may be adjusted to take up the wear at this point. The inner end of the link 40 is provided with a tail piece 140, which strikes a pin 141 on the crank plate and affords a positive stop at the outer limit of the collapsing mechanism.

The crank plate is also connected to the segment 6 by means of a pivoted link 45, the connection to the segment 6 at 46 being a detachable one. At its inner end the link 45 is provided with an elongated slot 47 which is passed over a pin 48 carried upon the crank plate.

Figure 2:
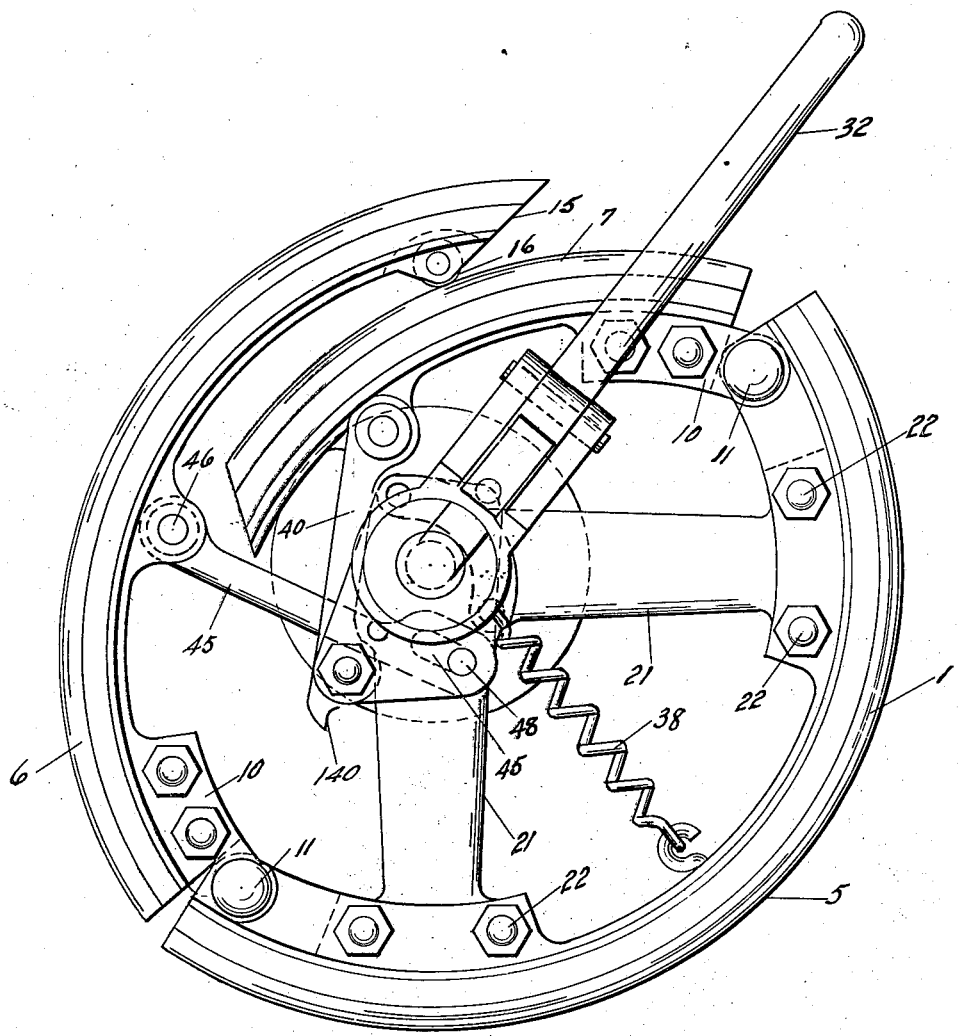
Figure 2 is a similar view showing the drum collapsed.

In the operation of the device, when the crank plate is revolved in the direction of the arrow in Figure 1 the link 40 rocks the segment 7 about its pivot 11 until the end of that segment has cleared the segment 6. During this time the pin 48 is moving idly in the slot 47 but when the segments have cleared, the pin has passed to the inner end of the slot and the segment 6 is moved inwardly to the position shown in Figure 2, the roller 16 riding upon the outer surface of the segment 7. Upon reverse movement of the crank plate the link 40 forces the segment 7 outwardly through pressure upon the roller 16 until it is expanded to its outermost position whereupon the segment 7 moves into its correct position.

It will be further noted that the detachable connections between the segment 5 and the arm 21, and between the segments 6 and 7 and thru operating links, afford a means for mounting drums of different widths and varying forms upon the same chuck or collapsing mechanism.

When the drum is in circular form, as shown in Figure 1, it will be observed that the pivot point 42 is slightly past center so that it will be locked in outer position.

The collapsing mechanism or chuck and the removable segmental drum or form constitutes a simple, inexpensive and easily operable unit for the construction of flat band tire carcasses. Various changes and modifications may be made in the details of construction of the drum and collapsing mechanism without departure from the essential features of the invention and such changes or modifications as fall within the scope of the invention as set forth in the claims are intended to be covered herein.

What is claimed is:

1. A collapsible tire building form comprising, a plurality of segments constituting the form, one of said segments being a stationary segment, movable segments hinged to the ends of the stationary segment, a rotatable operating member at the center of the form, and connections between the movable segments and the operating member to move first one segment and then the other.

2. A collapsible tire building form comprising, a fixed segment and a plurality of hinged segments at the ends of the fixed segment, an operating member within the form, and connections between the operating members and the hinged segments, the connection to one of said sections being of fixed length and the connection to the other being of variable length so that the first of said connections is operative during the entire movement of the operating member while the latter is operative during the latter portion of its movement.

3. A collapsible tire building form comprising, a fixed segment, a plurality of hinged segments at the ends of the fixed segment, an operating member within the form, a fixed connection between the operating member and one of the hinged segments, and a connection having provision for lost motion therein.

4. A collapsible tire building form comprising, a fixed segment, a plurality of hinged segments at the ends of the fixed segment, an operating member within the form, a fixed connection between the operating member and one of the hinged segments, and a connection having provision for lost motion therein at the beginning of movement of the operating member.

5. A collapsible tire building form comprising, a fixed segment, a plurality of hinged segments, a rotatable operating member at the center of the form, a link connecting the operating member and one of the hinged segments, and a second connection between the operating member and the other hinged segment, the second connection being inoperative to move the segment until after the link has operated to move the first hinged segment.

6. A collapsible tire building form comprising, a fixed segment, a plurality of hinged segments, an operating member, a link connecting the operating member and one of the hinged segments, and a second connection between the operating member and the other hinged segment, the second connection being inoperative to move the segment until after the link has operated to move the first hinged segment.

7. A collapsible tire building form comprising, a fixed segment, a plurality of hinged segments, a rotatable operating member at the center of the form, a link connecting the operating member and one of the hinged segments, a second connection between the operating member and the other hinged segment, the second connection having a pin and slot therein, thereby being inoperative to move the segment until after the link has operated to move the first hinged segment.

8. A collapsible tire building form comprising, two hinged segments, and a bearing roller on the inner face of one of the segments.

9. A collapsible tire building form comprising, two hinged segments, a bearing roller on the inner face of one of the segments, and means to move the two segments in overlapping relation.

10. A collapsible tire building form comprising, two hinged segments, an operating member, connection between the operating member and the segments and adapted to move them in sequence to overlapping position and then simultaneously to fully collapsed position, and a rolling contact device between the members.

11. A collapsible tire building form comprising, a central chuck member, collapsing mechanism on the chuck member, a plurality of segments all permanently hinged together constituting the form proper, and detachable connections between the form proper, the chuck and collapsing mechanism.

12. A collapsible tire building form comprising, a central chuck plate, arms radiating from the chuck plate, a rigid section, detachable connection between the arms and the rigid section, a collapsing mechanism on the chuck plate, two hinged sections on the ends of the rigid section, and detachable connections from the collapsing mechanism to the hinged section.

13. A collapsible tire building form comprising, a central chuck, a shaft therein, an operating plate rotatable on the shaft, a rigid section and two hinged sections constituting, the form, a link extending from the plate to one of the hinged sections, and a second connection between the plate and the other hinged section, the second connection having provision for lost motion therein.

14. A collapsible tire building form comprising, a central chuck, a shaft therein, an operating plate rotatable on the shaft, a rigid section and two hinged sections constituting the form, a link extending from the plate to one of the hinged sections, a second connection having provision for lost motion therein, and a roller on the under face of the second section adapted to bear upon the outer face of the first section.

FRANK L. JOHNSON.